United States Patent

[11] 3,628,712

| | | | |
|---|---|---|---|
| [72] | Inventor | Fred E. Clark<br>Akron, Ohio | |
| [21] | Appl. No. | 41,916 | |
| [22] | Filed | June 1, 1970 | |
| [45] | Patented | Dec. 21, 1971 | |
| [73] | Assignee | Akron Standard, division of Eagle-Picher<br>Industries, Inc.<br>Cincinnati, Ohio | |

[54] MILLSTOCK FESTOONING CONVEYOR
4 Claims, 2 Drawing Figs.

[52] U.S. Cl...................................................... 226/104
[51] Int. Cl...................................................... B65h 17/42

[50] Field of Search.................................... 226/104-107, 108

[56] References Cited
UNITED STATES PATENTS

| 1,499,134 | 6/1924 | Waldron........................ | 226/105 |
| 1,540,722 | 6/1925 | Colbert........................ | 226/104 |

*Primary Examiner*—Richard A. Schacher
*Attorney*—Mack D. Cook, II

ABSTRACT: Apparatus for use with a batch-off unit to reposition the outboard ends of spaced cantilever bars for festooning rubber stock from a sheeting or mixing mill, calender, or extruder for cooling, drying, storage and letoff.

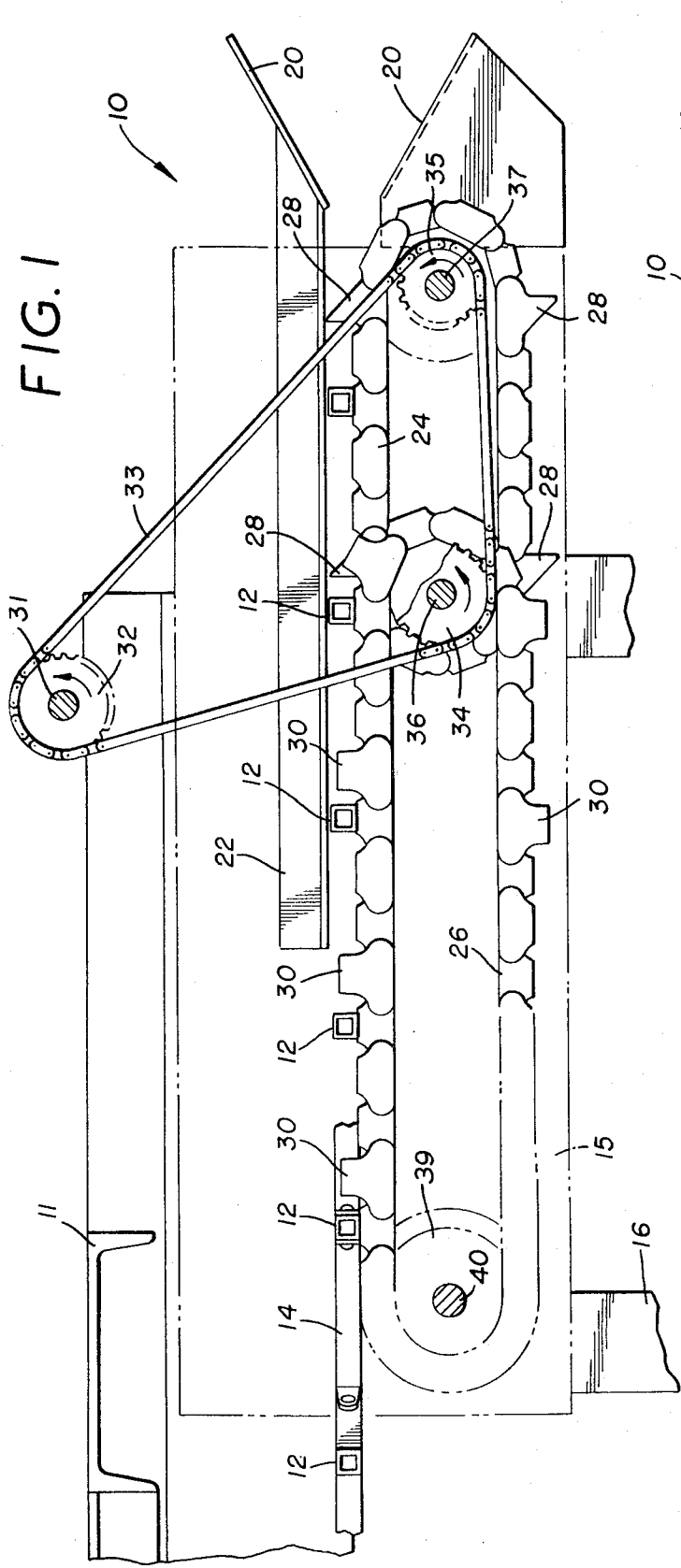
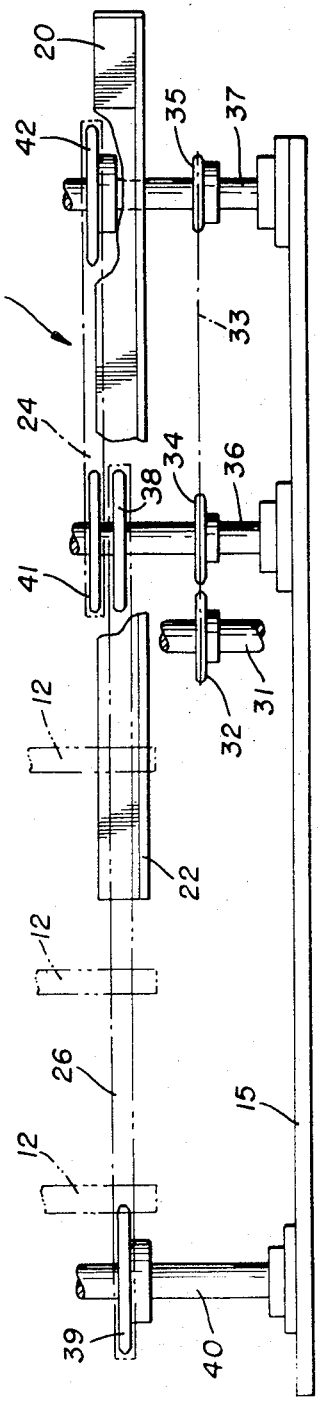

MILLSTOCK FESTOONING CONVEYOR

BACKGROUND OF THE INVENTION

The present invention relates to the efficient and precise handling of rubber stock from a sheeting or mixing mill, calender, or extruder on a "batch-off unit." A batch-off unit is used in connection with the mill, calender, or extruder under a Banbury mixer. A batch-off unit receives hot rubber stock which is thereafter dipped for antitacking and cooling and festooned on cantilever bars for further cooling, drying, and storage prior to letoff onto a skid or pallet.

A typical batch-off unit is normally located directly in front of the mill, calender, or extruder and includes as operative components a mill takeoff conveyor, dip tank and mesh belt conveyor, cantilever rack conveyor, and pullout conveyor, and wigwag stacker. The present invention is concerned with the cantilever rack conveyor components of a batch-off unit. The apparatus of the present invention is installed on the frame of the batch-off unit to operate in conjunction with a pinch roll and bar assembly component which assists in forming loops of stock during transfer of stock from the mesh belt conveyor to the cantilever rack conveyor.

Where space in front of the sheeting or mixing mill, calender, or extruder is limited, it is common to provide a batch-off unit in which the cantilever rack conveyor, between mesh belt conveyor and pullout conveyor, runs in a closed rectangular loop with right-angle turns. The festoon rack is provided by a series of cantilever bars intended to extend substantially laterally of and in a substantially horizontal plane from a motor-driven bar chain carried on the frame of the unit.

It has been found that the cantilever bars for festooning the stock will become twisted or distorted during repetitious movement in a closed loop. The resulting misalignment does not permit consistent festooning and adversely affects the handling of the stock. However, it has now been found that the concepts of the present invention will reposition the outboard ends of the spaced cantilever bars parallel to the plane of the stock at the time of pinching during festooning so as to provide consistent festooning.

SUMMARY OF THE INVENTION

The object of the invention is to provide apparatus which will efficiently and precisely handle rubber stock from a sheeting or mixing mill, calender, or extruder. More particularly, the object is to provide apparatus which will permit consistent festooning of long lengths of stock on a cantilever rack conveyor for cooling, drying, and storage. Specifically, it is an object to provide apparatus which will reposition the outboard ends of spaced cantilever bars for consistent festooning of rubber stock.

These and other objects of the invention, and the advantages thereof, will be apparent in view of the Description of A Preferred Embodiment as set forth below.

In general, apparatus according to the invention is mounted outboard the frame of a batch-off unit and is located adjacent a pinch roll and bar assembly which establishes the festoon loops as rubber stock is transferred from the dip tank via the mesh belt conveyor on to the chain actuated cantilever rack conveyor. The conveyor chain carries regularly spaced conveyor bars (e.g., 8 inches apart) which are successively engaged by and pass through the apparatus of the invention just prior to and during festooning of the rubber stock. The apparatus includes a V-shaped entrance guide transverse the movement path of the bars to correctly position the bars vertically. Behind the entrance guide is an upper retainer above the movement path of the bars to restrict upward movement of the bars. The apparatus also includes two vertically oriented successive chains carried outboard and behind the entrance guide and below the upper retainer. The leading chain moves at a faster speed than the conveyor chain and carries a series of upward projections adapted to contact the trailing side of a cantilever bar moving through the apparatus. These projections have a greater spacing (e.g., 10 inches apart) than the cantilever bars. The trailing chain moves at the same speed as the conveyor chain and carries a series of upward projections adapted to contact either side of a cantilever bar moving through the apparatus. These projections have the same spacing (e.g., 8 inches apart) as the cantilever bars. The projections on the faster chain will overtake cantilever bars having a trailing outboard end and move them forward to lateral alignment. The projections on the slower chain either maintain alignment of originally properly positioned bars or receive bars from the faster chain and retain their corrected position until after the rubber stock is festooned off the end of the trailing chain.

DESCRIPTION OF THE DRAWINGS

FIG. 1 is a fragmentary side view of a cantilever bar repositioning apparatus according to the invention, as carried on the frame of a batch-off unit;

FIG. 2 is a top plan view of the apparatus of FIG. 1.

DESCRIPTION OF A PREFERRED EMBODIMENT

An apparatus for use with a batch-off unit to reposition the outboard ends of spaced cantilever bars for festooning rubber stock is indicated generally by the numeral 10. The batch-off unit has a floor-mounted frame structure 11. The frame 11 carries and supports various components of a conventional batch-off unit including a cantilever rack conveyor.

The apparatus 10 is intended for use with a cantilever rack conveyor having a series of cantilever bars 12 (regularly spaced, e.g., 8 inches apart to define a 6-foot maximum loop of rubber stock) intended to extend substantially laterally of and in a substantially horizontal plane from a motor-driven first endless motion transmitting means or bar chain 14 carried on the frame 11 and moving in a closed loop in a horizontal plane. The apparatus 10 is intended for installation outboard the frame 11 to operate in conjunction with a conventional pinch roll and bar assembly batch-off unit component (not shown) which selectively engages the stock to form the down-hanging loops between cantilever bars 12.

The apparatus 10 includes a structural plate 15 (shown in chain lines in FIG. 1) preferably supported as by an auxiliary frame member 16. The plate 15 provides the outboard support and mounting for certain power transmission components of the drive means of apparatus 10.

As the cantilever bars 12 are moved by the bar chain 14 toward the apparatus 10 a V-shaped entrance guide 20 will receive and engage even a twisted or distorted bar 12. The entrance guide 20 provides a means transverse the movement path of the cantilever bars to correctly position the bars vertically in the correct horizontal plane. Behind the entrance guide 20 is an upper retainer 22. The upper retainer 22 provides a means extending linearly of the entrance guide 20 above the movement path of the cantilever bars to restrict upward movement of the bars from the correct horizontal plane. Outboard and behind the entrance guide 20 and below the upper retainer 22 are two horizontally oriented successive motor-driven endless motion transmitting means or chains, 24 and 26, moving below the movement path of cantilever bars.

The leading chain 24 carries a series of upward projections 28 adapted to engage the trailing side of cantilever bars which have passed through the entrance guide 20 and positioned in the correct horizontal plane. The projections 28 have a greater spacing e.g., 10 inches apart) than the cantilever bars. The trailing chain 26 carries a series of upward projections 30 adapted to contact either side of cantilever bars which have passed over the leading chain 24. The projections 30 have the same spacing e.g., 8 inches apart) as the cantilever bars. The leading chain 24 is driven at a surface speed faster than the surface speed of the trailing chain 26, which is driven at the same surface speed as the bar chain 14 by a drive means including suitable power transmission components.

As shown, the drive means and power transmission components for the apparatus 10 include a drive shaft 31 extending laterally from a suitable motor driven gear reduction unit (not shown) mounted on the frame 11. The shaft 31 carries a fixed sprocket 32. The sprocket 32 drives an endless chain 33 which is trained down toward and under a sprocket 34 and then slightly upward toward and around a sprocket 35 and then returned to sprocket 32. The sprocket 34 is fixed on a shaft 36 journaled on the outboard plate 15 and providing a common axis for the trailing end of chain 24 and the beginning end of chain 26. The sprocket 35 is fixed on a shaft 37 journaled on the outboard plate 15 and providing an axis for the beginning of chain 24. The sprockets 32 and 34 have the same effective diameter which is larger (greater) than the effective diameter of sprocket 35. Inboard of fixed sprocket 34, the common shaft 36 carries a fixed sprocket 38 for driving the chain 26. The trailing end of chain 26 rotates around an idler sprocket 39 on a shaft 40 journaled on the outboard plate 15. Inboard of sprocket 38, the trailing end of chain 24 rotates around an idler sprocket 41 on shaft 36. Inboard of fixed sprocket 35, the shaft 37 carries a fixed sprocket 42 for driving the chain 24. The sprockets 38, 39, 41, and 42 have the same effective diameter.

Although not shown, associated with the drive shaft 31 inboard of the apparatus 10 there are suitable power transmission components whereby the bar chain 14 is moved at a surface speed the same as the surface speed of chain 26. Thus, when shaft 31 is rotated by the drive motor the chain 24 is moved away from the entrance guide 20 at a surface speed faster (greater) than the surface speed at which the chain 26 is moving away from chain 24 while chains 14 and 26 are moving at the same surface speed.

While a preferred embodiment of the invention has been shown and described, it should be apparent that various changes and modifications could be made without departing from the spirit of the invention. For example, the chains 14, 24, and 26 could be endless motion-transmitting means fabricated as pulley or V-belts rather than metal links so long as the elements 14, 28, and 30 were securely affixed thereto. Also, the various sprockets (32, 34, etc.) comprising the power transmission components could be pulleys for use with a V-belt 33. Therefore, the true spirit and scope of of invention should be determined solely by extending linearly appended claims.

I claim:

1. Apparatus (10) for mounting outboard the frame (11) of a batch-off unit having a cantilever rack conveyor for festooning rubber stock, said conveyor including a frame-supported first endless motion transmitting means carrying regularly spaced cantilever bars (12), said apparatus comprising entrance guide means (20) transverse the movement path of said bars (12), retainer means (22) extending linearly of said guide means (20) above the movement path of said bars (12), second and third endless motion transmitting means outboard and behind said entrance guide (20) and below said retainer means (22), said second and third motion-transmitting means being horizontally oriented and successive below the movement path of said bars (12), the second or leading motion-transmitting means carrying a series of upward projections (28) adapted to engage the trailing side of bars (12) passing through said guide means (20), said projections (28) having a greater spacing than said bars (12), the third or trailing motion-transmitting means carrying a series of upward projections (30) adapted to engage either side of bars (12) passing over said leading motion-transmitting means, said projections (30) having the same spacing as said bars (12), and drive means whereby said leading motion-transmitting means is moved away from said entrance guide (20) at a surface speed faster than the surface speed at which said trailing motion-transmitting means is moved away from said leading motion-transmitting means and said trailing motion-transmitting means is moved at the same surface speed as the surface speed of said first motion transmitting means carrying said bars (12), whereby the outboard ends of said bars (12) extend substantially laterally of and in a substantially horizontal plane from said first motion transmitting means during festooning.

2. Apparatus according to claim 1 wherein said first, second and third endless motion transmitting means are motor-driven endless chains (14, 24 and 26).

3. Apparatus according to claim 2 wherein a structural plate (15) provides the outboard support and mounting for certain power transmission components of the drive means of apparatus (10) and said drive means includes a drive shaft (31) extending laterally from the frame (11) and carrying a fixed sprocket (32), the sprocket (32) driving an endless chain (33) which is trained down and under a sprocket (34) and then slightly upward toward and around a sprocket (35) and then returned to sprocket (32) the sprocket (34) being fixed on a shaft (36) journaled on the outboard plate (15) and providing a common axis for the end of chain (24) and the beginning of chain (26), the sprocket (35) being fixed on a shaft (37) journaled on the outboard plate 15 and providing an axis for the beginning of chain (24), the sprockets (32) and (34) having the same effective diameter which is larger than the effective diameter of sprocket (35).

4. Apparatus according to claim 3 wherein said drive means of apparatus (10) further includes inboard of sprocket (34) on the common shaft (36) a fixed sprocket (38) for driving the chain (26) and inboard of sprocket (35) on the shaft (37) a fixed sprocket (42) for driving the chain (24), the sprockets (38) and (42) having the same effective diameter.

* * * * *

UNITED STATES PATENT OFFICE
CERTIFICATE OF CORRECTION

Patent No. 3,628,712            Dated December 21, 1971

Inventor(s) Fred E. Clark

It is certified that error appears in the above-identified patent and that said Letters Patent are hereby corrected as shown below:

In The Abstract, line 4, after "storage and" delete "letoff" and insert --let-off--.

Col. 1, line 8, after "dipped for" delete "antitacking" and insert --anti-tacking--; line 10, after "prior to" delete "letoff" and insert --let-off--; line 13, after "mill" delete "takeoff" and insert --take-off--; line 14, after "and" delete "pullout" and insert --pull-out--; line 15, after "and" delete "wigwag" and insert --wig-wag--; line 25, after "and" delete "pullout" and insert --pull-out--; line 48, after "drying" delete the comma; line 64, after "a" delete "V-shaped" and insert --"V"-shaped--.

Col. 2, line 27, after "floor" delete the hyphen; line 41, after "down" delete the hyphen; line 48, after "a", delete "V-shaped" and insert --"V"-shaped--.

FORM PO-1050 (10-69)

UNITED STATES PATENT OFFICE
CERTIFICATE OF CORRECTION

Patent No. 3,628,712            Dated December 21, 1971

Inventor(s)       Fred E. Clark            PAGE - 2

It is certified that error appears in the above-identified patent and that said Letters Patent are hereby corrected as shown below:

Col. 3, line 22, after "41" delete the comma;

line 37, after "24" delete the comma; after "motion" delete the hyphen; line 38, after "or" delete "V-belts" and insert --"V"-belts--; line 39, after "28" delete the comma; line 42, after "a" delete "V-belt" and insert --"V"-belt--, delete "of" (second occurrence) and insert --the--; line 43, after "by" delete "extending linearly" and insert --the--; line 48, after "frame" delete the hyphen.

Col. 4, line 1, delete the parentheses around "12"; line 2, delete the parentheses around "20" and "12"; line 4, delete the parentheses around "20"; line 5, delete the parentheses around "22", after "motion" delete the hyphen; line 7, delete the parentheses around "12", after "motion" delete the hyphen; line 9, delete the

UNITED STATES PATENT OFFICE
CERTIFICATE OF CORRECTION

Patent No. 3,628,712              Dated December 21, 1971

Inventor(s) Fred E. Clark                    PAGE - 3

It is certified that error appears in the above-identified patent and that said Letters Patent are hereby corrected as shown below:

parentheses around "12"; line 10, delete the parentheses around "20" and "28"; line 11, delete the parentheses around "12"; line 12, before "transmitting" delete the hyphen;

line 13, delete the parentheses around "12";

line 14, after "motion" delete the hyphen;

line 15, delete the parentheses around "30"

and "12"; line 16, after "motion" delete the hyphen; line 17, delete the parentheses around "20"; line 18, after "motion" delete the hyphen; line 19, after "motion" delete the hyphen; line 20, after "motion" delete the hyphen; line 22, delete the parentheses around "12"; line 23, delete the parentheses around "12"; line 32, delete the parentheses around "10"; line 33, delete the parentheses around "11";  line 34, delete the parentheses around "32" (second occurrence); line 37, delete the parentheses around "32" and "34", and insert a comma after "32"; line 38, delete the parentheses around "15"; line 39, delete the parentheses around "24"; line 40, delete the

FORM PO-1050 (10-69)

UNITED STATES PATENT OFFICE
CERTIFICATE OF CORRECTION

Patent No. 3,628,712      Dated December 21, 1971

Inventor(s)     Fred E. Clark        PAGE - 4

It is certified that error appears in the above-identified patent and that said Letters Patent are hereby corrected as shown below:

parentheses around "26" and "35"; line 42, delete the parentheses around "24", "32" and "34"; line 44, delete the parentheses around "35"; line 46, delete the parentheses around "10" and "34"; line 47, delete the parentheses around "36"; line 48, delete the parentheses around "26", "35" and "37"; line 48, delete the parentheses around "24"; line 50, delete the parentheses around "38" and "42".

Signed and sealed this 13th day of June 1972.

(SEAL)
Attest:

EDWARD M. FLETCHER, JR.         ROBERT GOTTSCHALK
Attesting Officer               Commissioner of Patents